United States Patent [19]
Holt

[11] Patent Number: 5,453,828
[45] Date of Patent: Sep. 26, 1995

[54] METHOD OF OPTICAL SAMPLING

[75] Inventor: John Holt, Mold, England

[73] Assignee: British Nuclear Fuels plc, Cheshire, United Kingdom

[21] Appl. No.: 201,024

[22] Filed: Feb. 24, 1994

Related U.S. Application Data

[63] Continuation of Ser. No. 923,878, filed as PCT/GB92/00865, May 14, 1992. abandoned.

[30] Foreign Application Priority Data

May 14, 1991 [GB] United Kingdom .................... 9110376

[51] Int. Cl.⁶ ..................................................... G01J 1/42
[52] U.S. Cl. ....................... 356/218; 250/227.31; 356/121
[58] Field of Search ..................................... 356/121, 218, 356/225, 431; 250/227.31

[56] References Cited

U.S. PATENT DOCUMENTS

| 4,265,545 | 5/1981 | Slaker | 356/431 |
|---|---|---|---|
| 4,371,897 | 2/1983 | Kramer | 250/227.31 |
| 4,474,468 | 10/1984 | Shirakura et al. | 356/121 |
| 4,827,120 | 5/1989 | Stauffer | 250/227.31 |
| 4,939,739 | 7/1990 | Hobart et al. | |
| 5,070,237 | 12/1991 | Okayama et al. | 250/227.31 |
| 5,122,656 | 6/1992 | Williams | 250/227.31 |

FOREIGN PATENT DOCUMENTS

| 3510937 | 10/1986 | Germany | 356/121 |
|---|---|---|---|
| 646774 | 3/1986 | U.S.S.R. | |
| 2158942 | 11/1985 | United Kingdom | |

*Primary Examiner*—Richard A. Rosenberger
*Attorney, Agent, or Firm*—Nixon & Vanderhye

[57] ABSTRACT

The beam power of a laser beam is sampled by locating an elongate radiation conductive path across and substantially normal to the axis of the beam and detecting the light emitted at at least one of the ends of the radiation path, the radiation at the end of the radiation path being representative of the beam power of the laser.

The radiation conductive path can be a glass rod but preferably the path comprises one or more optical fibres.

10 Claims, 1 Drawing Sheet

METHOD OF OPTICAL SAMPLING

This is a continuation of application Ser. No. 07/923,878, filed Aug. 27, 1992 now abandoned which was based on PCT/GB92/00865 filed May 4, 1992.

BACKGROUND OF THE INVENTION

1. Field of the Invention

The present invention concerns a method of optical sampling. In particular the invention concerns a method of sampling beam power of a laser.

2. Discussion of Prior Art

It has proposed to sample beam power of a laser by deflecting a fraction of the light in the beam onto a detector by means of a glass window in the beam inclined at an angle to the axis of the beam. This has the disadvantage of causing a significant loss of power in the light transmitted through the window as well as introducing possible distortion into the beam path.

Another technique known in the prior art involves scanning a conducting wire across the laser beam as described in GB 2158942A. This technique is inefficient because light energy has to be converted into heat in the wire.

SUMMARY OF THE INVENTION

It is now provided, according to the present invention, to sample the beam power of a laser by locating an elongate radiation conductive path across and substantially normal to the axis of the laser beam and detecting the radiation emitted at at least one of the ends of the radiation path, the radiation at the end of the radiation path being representative of the beam power of the laser beam.

Desirably, the detection points at the end(s) of the channel are a significant distance, eg at least twice the beam diameter, desirably much further from the beam.

The radiation conductive path can be a glass rod but preferably the path comprises one or more optical, eg glass or plastics fibres. The optical fibre can be held in a fixed position across the beam path to provide continuous monitoring. Preferably, the fibre is scanned by sweeping or stepping periodically, preferably with a short mark-space application profile, eg with a space between scans of 5 seconds or more, the scan time being preferably in the range 1 to 5 seconds across the beam path. Where steps are used in a single scan the step spacing may be between 100 and 2000 microns, eg between 250 and 500 microns which is similar to the typical diameter of an optical fibre. Consequently, there is no radiation loss outside of the short scan period and no distortion.

For enhanced efficiency the optical fibre can be coated lengthwise along that half of its circumference directed away from the incoming radiation with an opaque layer. Such a layer blanks off radiation from the "upstream" side of the fibre.

Contrary to conventional usage of optical fibres in which light is introduced at one end of a fibre to travel axially along the length of the fibre and emerge at the opposite end, in the present invention radiation enters through the wall of the fibre to emerge at the opposite ends of the fibre.

Use of fibres to measure the optical power sampled by an optical element, eg diffraction grating, has been proposed in the prior art eg as in GB 146104A but in that case the fibre is being used in its normal mode. The optical element causes excessive beam losses and distortion. These can beneficially be minimised by using the method of the present invention instead.

When a fibre is placed in a laser light beam with the axis of the fibre perpendicular to the beam axis a certain portion of the light passes through the wall of the fibre. Owing to the fibre scattering mechanism a small fraction of this light is scattered in both directions along the axis of the fibre within its acceptance angle. Thus a light signal propagates equally in both directions with an intensity proportional to the optical beam power passing through the fibre and the volume of fibre in the beam. As the fibre is scanned through the beam it 'sees' a volume of the beam equivalent to a flat disc convolved with the shape of the fibre. As the fibre is normally uniformly circular in cross-section and the light can be considered to be scattered instantaneously as the beam passes across its axis, then integrating the light out of either end or both ends of the fibre as it scans the beam at a constant speed will result in a signal proportion to the mean power of the total beam provided that the profile does not change during the scan time.

If the fibre is held stationary in the beam the signal out of either end of the fibre can be analysed in real time to give a representation of the temporal pulse shape of the beam. Since the maximum length of fibre capturing light is of the order of 60 mm, equivalent to the maximum beam diameter, the transit time difference for the scattered light from the total capture length is sub-nanosecond and can be considered instantaneous. The length of fibre between the light capture region and the detectors is such that any modal dispersion of the signal due to size of the fibre is of a similar order of magnitude and can also be ignored. Thus the signal out of the stationary fibre will be proportional to time varying line integral through the beam.

Thus, for example, when an optical fibre is placed substantially perpendicular to and across a laser light beam, light emerges at the opposite ends of the fibre. This light emerging at the ends of the optic fibre is representative of the beam power of the laser, that is, the greater the intensity of the emerging light the greater the beam power of the laser. Further, light loss from the beam is minimal as only a slight shadow is cast by the optical fibre which can be, for example, 0.25 mm diameter. Typically, the fibre can have a diameter of from 100 to 2000 microns and the beam can have a diameter of say 10 to 60 mm.

The radiation signal from one end of a fibre may be employed as the power measurement signal. The other end may be coated with a reflective paint. Alternatively, the radiation signal at both ends of the fibre may be added to form the power measurement signal.

As an example only the method of sampling disclosed above can be used in assessing the temperature of a copper vapour laser. A copper vapour laser emits light at two distinct wavelengths, namely green and yellow and the amount of each colour depends on the opt rating temperature of the laser. Green light predominates at lower temperatures with the amount of yellow light increasing with increasing temperature. By locating a green filter over one end of the optical fibre and a yellow filter over the opposite end and sampling the light emerging from each of the filters it is possible to derive the ratio of green to yellow light in the laser and hence the operating temperature of the laser scanned by the fibre. This is one way of carrying out the invention described in our UK Patent Application No. GB 2249830A.

The present invention is most useful in the measurement of output power of laser beams whose cross-sectional diameter is significantly greater than the diameter of the radiation conducting channel, eg fibre, placed in the beam used to carry out the measurement. The output beam power may be in the range 0 to 500 watts.

The laser beams whose output power may be sampled by the method of the present invention are not limited to those in the visible spectral region. For example the laser beam may be emitted in the infra-red or ultra-violet regions of the spectrum. The beam may be from an excimer laser emitting in the ultra-violet region. In this latter case, the fibre may be or may be coated with a material which absorbs ultra-violet radiation and fluorescences in another spectral, eg the visible region in which detection of light transmitted at the end of a fibre may be detected by conventional optical photodetectors, eg as described above.

A plurality of fibres may be employed at the same position in a laser beam to integrate samples of the intensity of the beam at that position. The plurality may for example comprise a fibre optic mat, the optical signals travelling down the fibres of the mat being collected and detected by a common photo-detector. Such a mat may be fixed in position in the path of the laser beam or scanned across it depending on the application.

Different fibres may also be employed at different positions axially along the beam. Signals picked up at different positions may be employed to determine other properties of the beam, eg pulse length and pulse edges for a beam/of pulsed output.

Different fibres may be employed in a similar manner to sample the power output of different beams, eg to detect the pulse edges of different beams employed together in a multi-beam system.

The intensity of radiation emerging from the end of a fibre may be detected in methods embodying the present invention by any one of the methods well known to those skilled in the electro-optics art. For example, a/light sensitive resistor may be employed for this purpose in a detector circuit. Alternatively, a photodiode producing a photocurrent may be used. In the case where a fibre is stepped or swept across the beam to be measured, the signal provided by the detector output is integrated by an integrator. This adds the instantaneous power readings as the fibre passes through the beam. This sum represents the total power output of the beam. The output of the integrator is desirably applied to a sample and hold circuit to sample and then to hold the output of the integrator at the end of a scan period. The output of the sample and hold circuit is desirably applied to a display eg any known display such as a digital or analogue voltmeter. It may be displayed as a power reading calibrated against a know power measurement.

BRIEF DESCRIPTION OF THE DRAWING

An embodiment of the present invention will now be described by way of example with reference to the accompanying drawing, in which.

DETAILED DISCUSSION OF PREFERRED EMBODIMENTS

Figure 1:
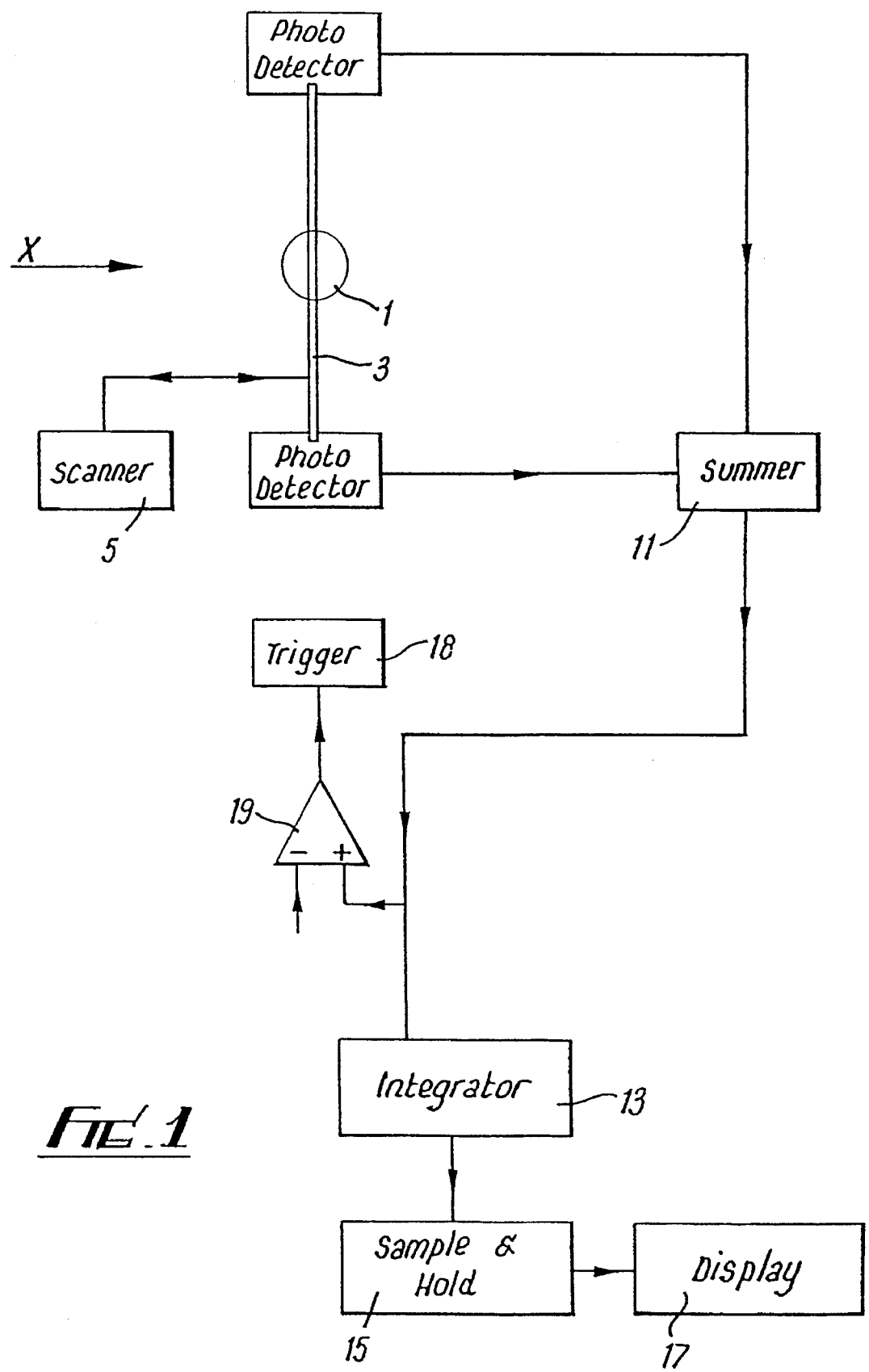
FIG. 1 is a block schematic diagram of an arrangement for measuring the output power of a laser beam.

In FIG. 1 a laser beam 1 is shown in cross-section. The beam 1 may be the output of a copper vapour laser. An optical glass fibre 3 typically 250 micrometers in diameter arranged by holding means (not shown) including optical connectors at the respective ends of the fibre is retained in a plane (the plane of the drawing) perpendicular to the beam 1 and the holding means and fibre 3 are stepped in position by a scanner 5 in a direction X across the beam 1. The light picked up from the beam 1 and travelling down the fibre 3 is detected at the ends of the fibre 3 respectively by photodetectors 7,9. The output of the photodetectors is added by a summer 11. The summer ill adds the instantaneous outputs of the photodetectors 7,9 for each position of the fibre 3 as it scans across the beam 1. The instantaneous outputs are integrated by an integrator 12, the output of which is periodically sampled and then held by a sample and hold circuit 15 providing an analogue output to a display 17, eg a digital voltmeter. The reading on the display 17 gives a measure of the sampled power of the beam 3.

The output signal from the summer 11 gives an indication of where the beam starts and finishes as the fibre 3 traverses it. This signal is fed to a comparator 19 (as well as to the integrator 13) to detect the edge of the beam 1 thereby to produce a trigger signal in a trigger 18 to control the start and end of the sample phase of the sample and hold circuit 15, the hold phase of that circuit following the sample phase whilst the fibre 3 is returned to its starting position.

I claim:

1. A method of sampling only a portion of the beam power of a laser beam Which method comprises the steps of:

locating an elongate radiation conductive material across and substantially normal to the axis of the beam where said beam, in a direction normal to the axis of the beam, is wider than said conductive material in said direction;

detecting radiation emitted at at least one of the ends of the conductive material, the radiation at the end of the conductive material being picked up from the beam and being representative of the beam power of the laser beam; and determining, based upon said detected radiation, the beam power of said laser beam.

2. A method as claimed in claim 1 and in which the radiation conductive material is obtained by locating an optical fibre across the axis.

3. A method as claimed in claim 2 and which includes locating a plurality of fibres across the axis of the laser beam.

4. A method as claimed in claim 2 and wherein an opaque layer is provided on the surface of the optical fibre directed away from the incident radiation.

5. A method as in claim 2 and wherein a plurality of fibres are located across the beam and the radiation signals at the ends of the fibres are all detected together.

6. A method as claimed in claim 1, and wherein the radiation emitted at both ends of the radiation conductive material is detected by detectors and a signal representative of the two is added to form a sum.

7. A method as claimed in claim 1 and which comprises holding the radiation conductive material in a fixed position to provide continuous monitoring of the laser beam.

8. A method of sampling the beam power of a laser beam which method comprises the steps of;

locating an elongate radiation conductive material across and substantially normal to the axis of the beam; and detecting radiation emitted at at least one of the ends of the conductive material, the radiation at the end of the conductive material being picked up from the beam and being representative of the beam power of the laser beam wherein the laser beam is scanned by sweeping or stepping across the beam and signals representative of the beam power at different positions of the scan are integrated to form a signal representative of the total laser beam power.

9. An apparatus for sampling only a portion of the beam power of a laser beam, said apparatus comprising:

an elongate radiation conductive material having at least one end, said conductive material located across and substantially normal to said laser beam;

means for scanning said conductive material across said laser beam;

radiation detection means, responsive to radiation at said at least one end of said radiation conductive material, for detecting radiation in said radiation conductive material, said detected radiation being representative of the beam power of the laser beam; and means for determining, based upon said detected radiation, the beam power of said laser beam.

10. A method of sampling only a portion of beam power of a laser beam, said method comprising the steps of:

scanning across and substantially normal to the axis of the beam an elongate transparent light conductor having at least one end, said transparent conductor picking up a sample of radiation from the beam;

detecting radiation in the conductor at said at least one end of the conductor, said detected radiation being representative of the power of the laser beam; and determining, based upon said detected radiation, the beam power of said laser beam.

\* \* \* \* \*